Patented Sept. 28, 1943

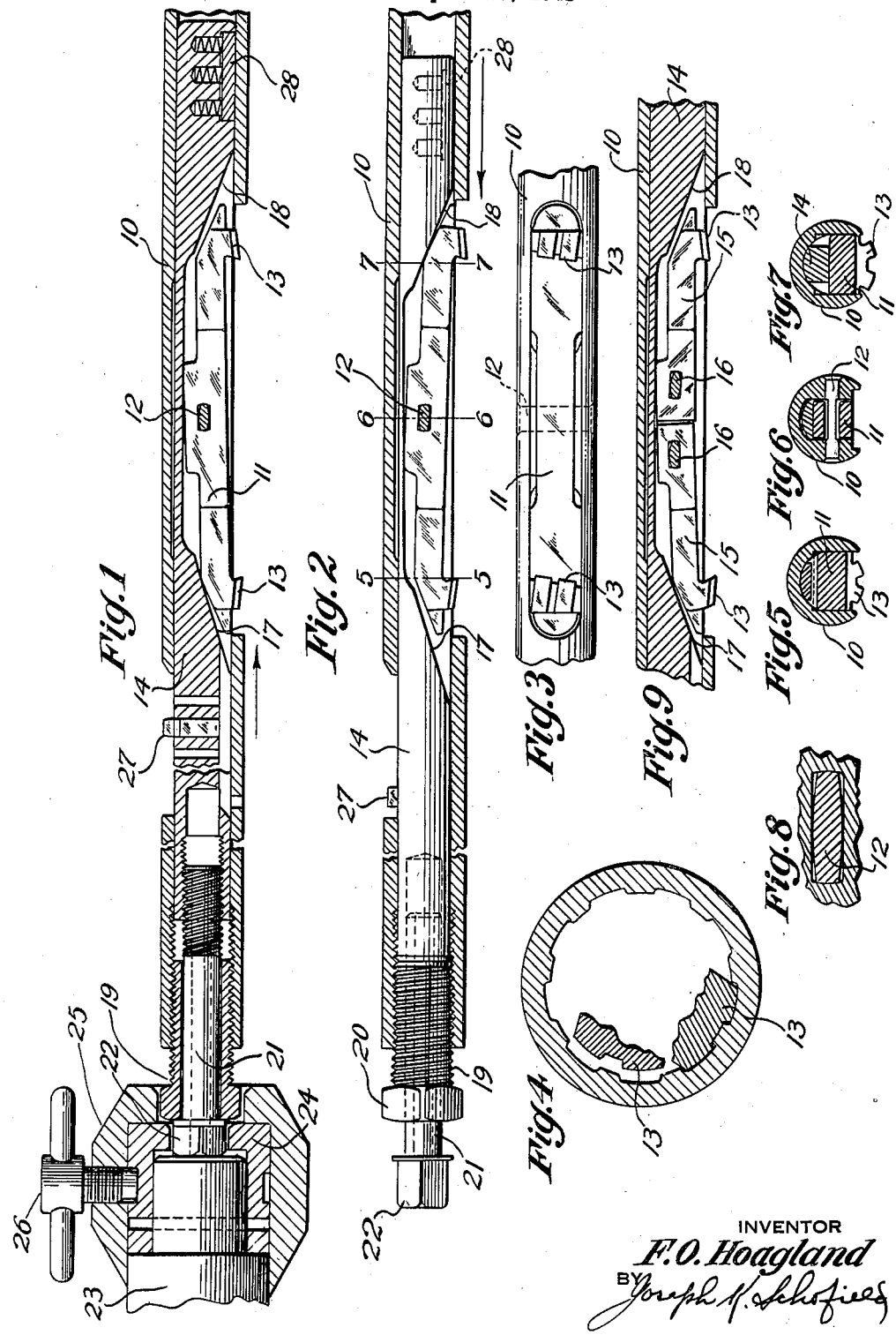

2,330,584

UNITED STATES PATENT OFFICE 2,330,584

TOOLHEAD FOR RIFLING MACHINES

Frank O. Hoagland, West Hartford, Conn., assignor to Niles-Bement-Pond Company, West Hartford, Conn., a corporation of New Jersey Application April 26, 1941, Serial No. 390,582

7 Claims. (Cl. 90—28.1)

This invention relates to a tool or cutter head for a gun barrel rifling machine and particularly to a head of this type having oppositely disposed cutters so disposed that one may operate in each direction of reciprocation of the rifling head through the gun barrel.

An object of the present invention is to provide an improved cutter or tool head for a gun barrel rifling machine in which a cutting operation can be effected into one or more grooves of the rifling in each direction of movement of the head.

One feature which enables me to accomplish the above object is that the rifling head is provided in the preferred embodiment of the invention with a longitudinally extending cutter member pivotally supported centrally upon a transverse axis and having cutting edges at its opposite ends, the longitudinal distance between the opposed cutting edges being predetermined so that one cutter will engage one rifling groove in one direction of movement and the oppositely disposed cutter will engage an adjacent groove when the head is moved in the opposite direction.

Another object of the invention is to provide improved feeding mechanism for radially advancing the cutters during the progress of the rifling operation, this means including a member slidably mounted within the head which in either extreme position serves to support one end of the pivotally mounted cutter member and retain the cutter at that end in its cutting position.

And finally it is an object of the invention to provide means to regulate the length of movement and the limits of movement of this slidable member to vary the operative positions of the cutters to progressively cut deeper into the gun barrel with each successive stroke.

A feature of this feeding mechanism enabling the above object to be accomplished includes a differential screw engaging the slidable member and having a head limiting movement of this slide in one direction, adjustment of the differently threaded members varying the length of slidable movement of the slide so that variations in operative positions of the cutters may be effected.

With the above and other objects in view the invention may include the features of construction and operation set forth in the following specification and illustrated in the accompanying drawing.

In the accompanying drawing annexed hereto and forming a part of this specification I have shown the invention embodied in a tool or cutter head particularly designed for rifling a gun having nine rifling grooves and a bore of 20 millimeters.

In the drawing:

Figure 1 is a longitudinal view in section of a complete rifling head made in accordance with the present invention.

Fig. 2 is a similar view with the cutter member in its opposite position.

Fig. 3 is a plan view of some of the parts shown in Figs. 1 and 2.

Fig. 4 is a cross sectional view upon an enlarged scale of a barrel being rifled and the cutters used for that purpose.

Figs. 5, 6 and 7, respectively, are sections taken on the planes of lines 5—5, 6—6 and 7—7 of Fig. 2.

Fig. 8 is a longitudinal section of one of the pivots for a cutter member upon an enlarged scale; and Fig. 9 is a partial longitudinal sectional view of a modified form of cutter member.

In the above-mentioned drawing there has been shown but one embodiment of the invention and a slightly modified form thereof which are now deemed preferable, but it is to be understood that changes and modifications may be made within the scope of the appended claims without departing from the spirit of the invention.

Briefly and in its preferred aspect, the invention may include the following principal parts: First, an elongated cylindrical member suitably recessed for a substantial distance longitudinally and having a diameter permitting it to pass through the bore being rifled; second, a pivotally mounted member extending within this longitudinal recess and supported for limited tilting movement upon a transverse axis substantially centrally of the recess; third, a slide housed within the cylindrical member and having opposed oblique surfaces adapted to contact and support opposite ends of the pivotally mounted member when moved limited distances within the cylindrical member; fourth, means to vary the length and limits of sliding movement of this member; and fifth, cutters mounted in opposed relation to each other on the opposite ends of the pivoted member or at the free ends of oppositely extending pivotally mounted members.

In rifling machines now in general use it is standard practice to effect cutting operations in one direction of movement of the cutter head only. The primary object of the invention, therefore, is to double the production of these standard rifling machines by the provision of a cutter having opposed cutting edges so that the cutter is adapted for cutting in both directions of movement of the tool head through the barrel. Also in rifling machines now in use feeding mechanism for the cutters for successive and deeper cuts to form the grooves have been provided. It is another principal object of the invention to improve this feeding mechanism and adapt it for double acting operation of the machine so that the cutting position of each of the cutting edges at opposite ends of the cutter may be individually controlled for each successive cut. While a cutter having opposed cutting edges has been described as shown in this application, some of the advantages of the present invention are applicable to a cutter having one or more cutting edges at one end only. The pivotal cutter is positively tilted at each reversal of movement of the head through the barrel being rifled. The cutting edge, therefore, will be positively withdrawn from the rifling groove during the non-cutting stroke and positively advanced to its cutting position when movement of the head is reversed.

Referring more in detail to the figures of the drawing, the rifling head illustrated includes an elongated member 10 tubular in cross section and whose outside diameter corresponds with the diameter of bore being rifled so that it may slide easily therethrough. Means at one end (not shown) are provided by means of which this member may be passed back and forth through the barrel being rifled in the usual manner while being rotated to conform to the rifling. Also, indexing means are provided to successively rotate the member to cut the series of rifling grooves. This cylindrical tubular member 10 is slotted longitudinally for a considerable portion of its length and supports a cutter member 11 preferably centrally pivotally mounted upon a transverse pin 12. This cutter member 11 is elongated and has cutting surfaces 13 at its opposite ends positioned in opposed relation to each other and at a predetermined distance apart for a reason presently to be described. As will be seen by an inspection of Figs. 5, 6 and 7 this member is laterally supported by the side walls of the recess in the cylindrical member 10 within which the cutter member 11 is positioned.

The rifling head shown in the annexed drawing is adapted for application to a machine such as shown in the patent to Sponsel 446,898 and may be reciprocated and angularly indexed by the means shown in this patent.

In order to adjustably position the cutters for their cutting strokes the cutter member 11 may be pivotally mounted as shown upon its transverse central axis and tilted to engage the cutters 13 at its opposite ends by a longitudinally movable slide 14. In the embodiment of the invention shown in Figs. 1, 2 and 3 the cutter member is elongated and pivotally supported centrally of its length and provided with integrally formed opposed cutters adjacent its opposite ends. In the modified form shown in Fig. 9 two individually pivoted cutter members 15 are shown, there being two pins 16 adjacent each other upon which the opposed cutting tools may pivot.

The cutter member 11, as shown in Figs. 1, 2 and 3, is disposed longitudinally of the head 10 and in operation these members are given a rotary movement simultaneously with their axial movement to form the helical grooves as by means described in the above-referred-to patent. The distance between the cutters 13 or 15 is critical and is determined for each particular disposition of rifling grooves so that in one direction of movement of the head 10 through the bore being rifled one of the cutters will be operated to cut a portion of one or more grooves and in the opposite direction of movement the opposite cutter will engage and cut a portion of an adjacent groove. If desired, however, during the finishing operation of the rifling, one of the cutters may be used exclusively and the opposite cutter retained in an inoperative position as will presently be described.

In order to oscillate the cutter member 11 to alternately bring one of the opposed cutters into operative position, the member or slide 14 extending longitudinally within the rifling head 10 is mounted for slidable movement, the distance moved being limited by means presently to be described. In one extreme position of this slidable member, as shown in Fig. 1, an oblique or angular surface 17 engages and supports the left-hand end of the cutter member 11 at a point adjacent or just below its cutting edges, and when this slidable member is moved in the opposite direction to its extreme position the opposite cutter is engaged and supported in operative position by a corresponding oblique surface 18 as shown in Fig. 2. Means are provided to slide this member 14 from one limited extreme position to the other at the end of each stroke of the rifling head through the bore being rifled, the distance moved also being varied during the progress of the cutting operation to cause the cutters to progressively cut deeper into the barrel.

To control the distance moved by the slide 14 to vary the radial position of the cutting surfaces 13 the following mechanism is provided. One end of the cylindrical member 10 forming the rifling head is internally threaded and has inserted therein a threaded sleeve 19 there being a non-circular head 20 thereon at its outer end. The end of the slide 14 is also internally threaded and is engaged by an elongated rod 21 having screw threads on its inner end and having a non-circular head 22 at its outer end. The lead of the screw threads on this rod 21 is exactly twice the lead of the screw threads on the sleeve 19 and both screw threads are of right-hand helix. The rod 21 is long enough so that with its threaded end entering the slide 14 the slide may move a predetermined distance. In Fig. 1 the slide is shown at its extreme right-hand position and the left end of the slide 14 is spaced a substantial distance from the inner end of the sleeve 19. In this position the head 22 of the rod 21 abuts against the head 20 of the sleeve 19 and limits movement to the right of the slide. In Fig. 2 the slide 14 is in its left-hand position relative to the sleeve or head 10 and the end of the slide 14 abuts against the inner end of the threaded sleeve 19 which limits the position of the slide. The extreme left-hand position of the slide 14 is determined by the position of the sleeve 19 threaded into the cylindrical member 10 and the extreme right-hand position of the slide 14 is determined by the position of the rod 21 threaded into the sleeve. By rotating the sleeve 19 and the rod 21 simultaneously the distance moved by the slide 14 and its extreme positions at the ends of its left and right movements may be varied.

By simultaneously rotating the sleeve 19 and rod 21 in one direction as by feeding means shown in the above-referred to patent the distance moved by the slide 14 may be slightly increased. This is due to the difference in lead of the screw threads on the sleeve 19 and rod 21. Increased movement of the slide 14 causes the cutter member 11 to engage different portions of the oblique surfaces 17 and 18 and thus advance the cutters radially to new cutting positions.

To rotate the rod 21 and sleeve 19 a chuck 23 may be mounted on the feed mechanism shown in the above-referred to patent so that when the head 10 reaches one end of the machine the rod has its head 22 entered within a jaw member 24 and the sleeve 19 has its head 20 entered within jaw member 25. At this point the step-by-step feeding action of the machine acts to rotate the chuck 23 to rotate the members 24 and 25 through a small angle. After initially setting the rod 21 and sleeve 19 for the rifling operation the jaw member 25 may be clamped in any angular position by clamping screw 26 to the jaw member 24 to accommodate the heads of the rod and screw.

To move the slide 14 to its opposite position at the opposite end of the movement of the rifling head 10 a lug 27 on the slide may be engaged by a member (not shown) on the rifling machine near the end of its stroke. To frictionally retain the slide 14 in position during the cutting operation a spring pressed member 28 housed within a portion of the slide may bear against the inner surface of the cylindrical member 10.

I claim:

1. A tool head for gun barrel rifling machines comprising in combination, a sleeve, a member having cutting edges at its opposite ends pivotally supported within said sleeve, a member axially slidable within said sleeve and having portions engaging and supporting an end of said pivotally supported member, and means to vary the movement of said slidable member.

2. A tool head for gun barrel rifling machines comprising in combination, a sleeve, a member extending axially therein and having cutting edges at its opposite ends, means to support said member for pivotal movement, a slide within said sleeve having portions alternately engaging an end of said pivotally supported member when moved axially within said sleeve, and means to move said slide between variable limits within said sleeve.

3. A tool head for gun barrel rifling machines comprising in combination, a sleeve, a member extending axially therein and having cutting edges at its opposite ends, means to centrally support said member for pivotal movement, a slide within said sleeve having portions alternately engaging an end of said pivotally supported member when moved axially back and forth within said sleeve, and means to limit said slide to movements between variable limiting positions within said sleeve.

4. A tool head for gun barrel rifling machines comprising in combination, a sleeve, a member having cutting edges at its opposite ends a predetermined distance apart and pivotally supported centrally therein, a member slidable within said sleeve and having portions engaging an end of said pivotally supported member at the end of its slidable movements in each direction, and means to variably limit the movement of said slidable member.

5. A tool head for gun barrel rifling machines comprising in combination, a sleeve, a member having cutting edges at its opposite ends a predetermined distance apart and pivotally supported centrally therein, a member slidable within said sleeve and having portions engaging an end of said pivotally supported member at the end of its slidable movement in each direction, and rotatable threaded members to variably limit the movements of said slidable member.

6. A tool head for gun barrel rifling machines comprising in combination, a sleeve, cutters positioned in spaced and opposed relation to each other and movable radially within said sleeve, a member axially slidable within said sleeve and having portions adapted to engage and support a cutter in its cutting position when moved to its extreme position in each direction, and means to vary the limits of movement of said slidable member in each direction, whereby the radial positions of said cutters when supported in cutting position may be varied.

7. A tool head for gun barrel rifling machines comprising in combination, a sleeve, a cutter member having cutting edges at its opposite ends centrally pivotally supported within said sleeve, a member axially slidable within said sleeve and having portions alternately engaging and supporting an end of said pivotally supported member when moved in opposite directions, and means to effect movements of said slidable member within said sleeve to vary the radial positions of said cutting edges in accordance with reciprocatory movements of said sleeve through a barrel being rifled.

FRANK O. HOAGLAND.

CERTIFICATE OF CORRECTION.

Patent No. 2,330,584.   September 28, 1943.

FRANK O. HOAGLAND.

It is hereby certified that error appears in the printed specification of the above numbered patent requiring correction as follows: Page 3, second column, line 53, claim 7, after the word and period "rifled." insert the following claims -

-- 8. A tool head for gun barrel rifling machines comprising in combination, a sleeve, a cutter bar having a cutting edge at one end, and pivoted intermediate its ends in said sleeve, a member axially slidable within said sleeve and having opposed oblique surfaces alternately engaging and supporting the opposite ends of said cutter bar, means to move said member within said sleeve to cause alternate engagement and disengagement of said oblique surfaces with the ends of said cutter bar to project and withdraw said cutting edge.

9. A tool head for gun barrel rifling machines comprising in combination, a sleeve, a cutter bar extending axially therein and having a cutting edge at one end, means to support said cutter bar intermediate its ends for pivotal movement, a slide within said sleeve having oblique surfaces alternately engaging and disengaging the opposite ends of said cutter bar when moved axially within said sleeve, to project and withdraw said cutting edge, and means to move said slide between variable adjustable limits at either end of its stroke.

and that the said Letters Patent should be read with this correction therein that the same may conform to the record of the case in the Patent Office.

Signed and sealed this 21st day of December, A. D. 1943.

(Seal)

Henry Van Arsdale,
Acting Commissioner of Patents.